United States Patent [19]

Fukuda

[11] Patent Number: 5,233,888
[45] Date of Patent: Aug. 10, 1993

[54] METHOD AND SYSTEM OF CONTROLLING SHIFT OF TRANSMISSION SPEED RATIO FOR GAS TURBINE ENGINE VEHICLE

[75] Inventor: Daiki Fukuda, Fuji, Japan

[73] Assignee: Toyota Jidosha Kabushiki Kaisha, Aichia, Japan

[21] Appl. No.: 710,073

[22] Filed: Jun. 4, 1991

[30] Foreign Application Priority Data

Jun. 6, 1990 [JP] Japan ............................ 2-146345

[51] Int. Cl.$^5$ ............................................. B60K 41/06
[52] U.S. Cl. ................................... 74/866; 364/424.1
[58] Field of Search ...................... 74/866; 364/424.1

[56] References Cited

U.S. PATENT DOCUMENTS

| | | | |
|---|---|---|---|
| 4,947,330 | 8/1990 | Hiramatsu | 364/424.1 |
| 4,947,970 | 8/1990 | Miller et al. | 74/866 X |
| 5,007,147 | 4/1991 | Imai et al. | 74/866 |
| 5,025,685 | 6/1991 | Kobayashi et al. | 74/866 |
| 5,040,114 | 8/1991 | Ishikawa et al. | 74/866 |

OTHER PUBLICATIONS

Preliminary Issuance of a Study Meeting held by the Scientific Body 881 P229–P232, Society of Automotive Engineers of Japan, Inc.

Primary Examiner—Richard M. Lorence
Assistant Examiner—Benjamin Levi
Attorney, Agent, or Firm—Kenyon & Kenyon

[57] ABSTRACT

In a gas turbine engine vehicle having a two-shaft type gas turbine engine including a gas generator constituted by a compressor and a compressor turbine arranged coaxially with the compressor, a combustion chamber, a variable nozzle, and a power turbine rotatable about a turbine shaft independently of a shaft of the compressor and the compressor turbine, a transmission speed ratio is shifted to a higher stage than the current transmission speed ratio when an engine acceleration requirement is greater than a predetermined value. As a result, a lowering of a vehicular acceleration characteristics due to a response lag in a variation of revolution speed at the compressor turbine can be prevented, and thus an enhanced acceleration and deceleration of the automotive vehicle is provided.

5 Claims, 11 Drawing Sheets

N1: ROTATION SPEED OF COMPRESSOR TURBINE

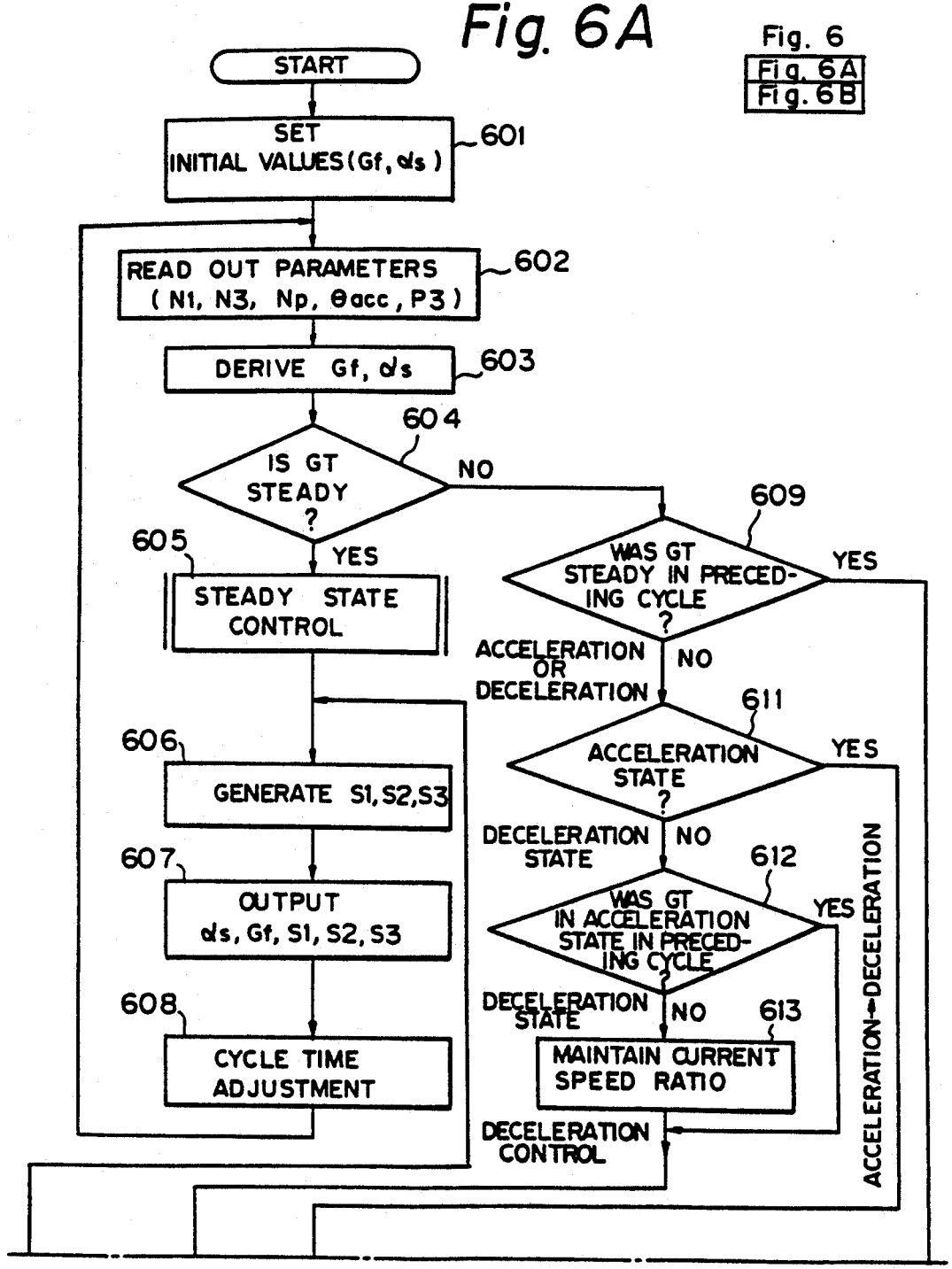

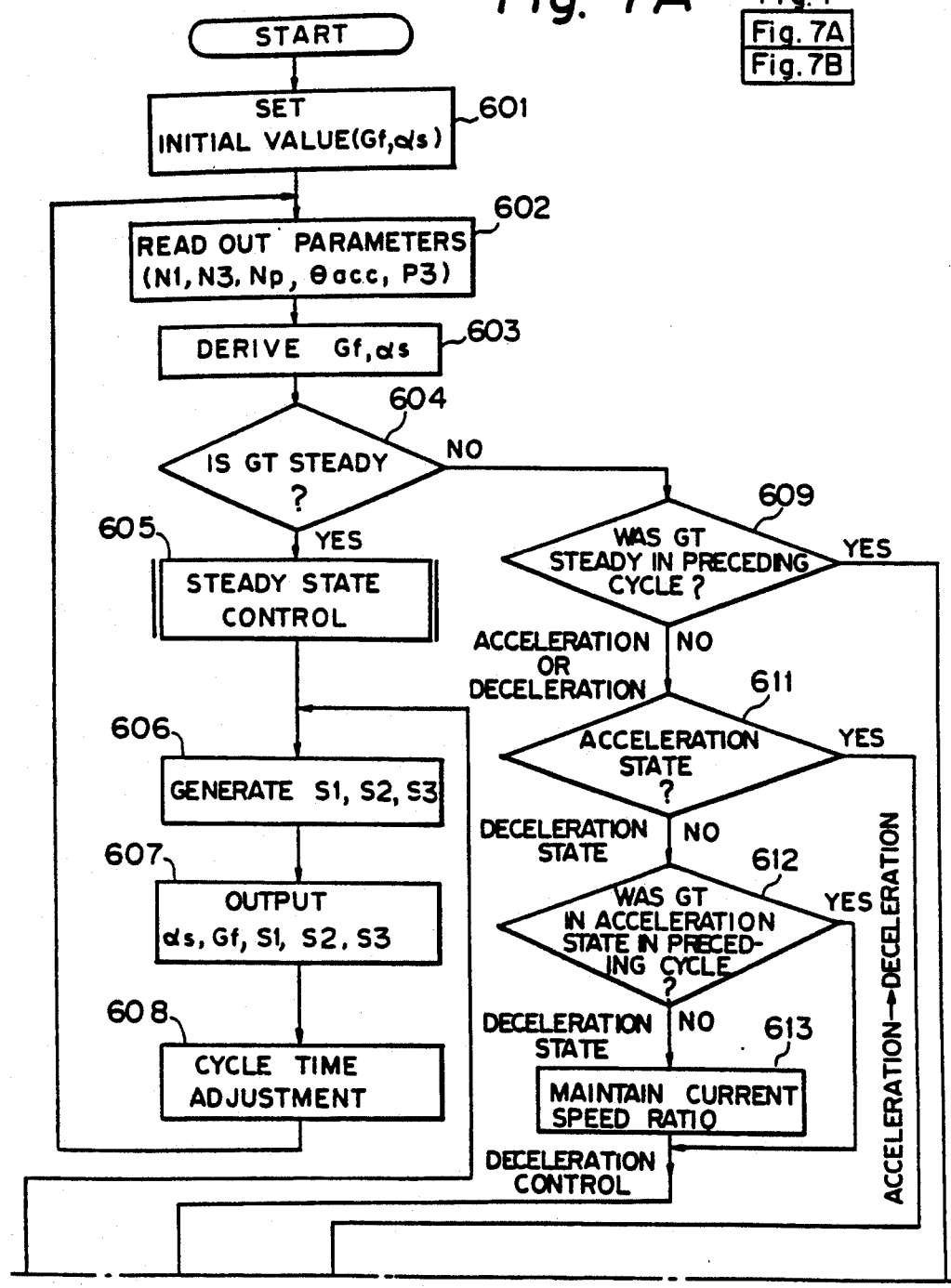

METHOD AND SYSTEM OF CONTROLLING SHIFT OF TRANSMISSION SPEED RATIO FOR GAS TURBINE ENGINE VEHICLE

BACKGROUND OF THE INVENTION

1) Field of the Invention

The present invention relates a method and a system for controlling a shift of a transmission speed ratio for a gas turbine engine vehicle, by which enhanced response characteristics in a transition from steady state to acceleration state are provided.

2) Description of the Related Art

Due to the ease of operation thereof, a two-shaft type gas turbine engine is principally used as an automotive gas turbine engine. FIG. 1 shows a typical construction of a power train employed in a gas turbine engine vehicle having an automatic power transmission.

In such a two-shaft type gas turbine engine, the engine is started by driving a front gear F/G, and then intake air is compressed by a compressor C, heated by a heat exchanger HE, and combusted in a combustion chamber CC by mixing same with a fuel supplied from an actuator A1. The thus-generated combustion gas drives a compressor turbine CT arranged coaxially with the compressor C. The compressor turbine CT and the compressor C as combined will be referred to hereinafter as "the gas generator GG". The compression at the compressor C varies in accordance with the revolution speed of the compressor turbine CT. The combustion gas used for driving the compressor turbine CT is transferred through a variable nozzle VN, the combustion gas path area of which is adjustable by an actuator A2, for driving a power turbine PT, and the combustion gas then passes through the heat exchanger HE and is exhausted to the atmosphere as an exhaust gas.

The actuators A1 and A2 are controlled by a control circuit CONT, in accordance with the driving conditions of the engine. This control is enabled by an input of an accelerator pedal depression magnitude and engine driving parameters from sensors (not shown) to the control circuit CONT. In FIG. 1, encircled figures indicating the intake air pressure P and temperature T represent the intake air and temperature at the corresponding position thereof.

A revolution speed N2 of the power turbine PT is reduced to a rotation speed N3 by a reduction gear R/G, and the rotation speed N3 is then further adjusted by an automatic power transmission A/T, in accordance with a shift position thereof and the engine driving conditions. The output of the automatic power transmission is then transferred to a differential gear unit D via a propeller shaft, to drive wheels W mounted on a wheel axle, and thus drive the vehicle.

In general, the automotive automatic power transmission with a torque converter is controlled according to predetermined shift characteristics, in terms of an input torque and a vehicle speed. The vehicle speed is normally obtained by monitoring a rotation speed at an output shaft of the automatic power transmission A/T. In the case of a reciprocation type engine such as a gasoline engine or Diesel engine, however, the input torque is obtained from an accelerator pedal depression magnitude, which is proportional to the output torque of the engine. Conversely, in the case of a gas turbine engine, since there is a plurality of parameters affecting the input torque, it is not possible to detect the torque solely by the accelerator pedal depression magnitude.

Therefore, in the prior art, the engine output torque is detected by utilizing parameters such as the output pressure P3 of the compressor, the operating position of the variable nozzle NV, and so forth, as disclosed in Japanese Unexamined Patent Publication (Kokai) 61-163030.

FIG. 2 shows one example of a shift pattern of the automatic power transmission, in which the abscissas represents the rotation speed at the output shaft of the automatic power transmission, and ordinates represent a displacement magnitude $\theta th$ of the throttle cable (accelerator pedal depression magnitude $\theta acc$). In the prior art, a shift control for the automatic power transmission A/T utilizes a shift characteristics map representing the shift pattern as shown, in terms of the rotation speed Np (vehicle speed) of the output shaft of the automatic power transmission and a parameter corresponding to the engine output torque (in the shown example, the accelerator pedal depression magnitude $\theta acc$).

When the automatic power transmission employed in an automotive vehicle having a two-shaft type gas turbine engine is controlled by utilizing the shift pattern of FIG. 2, which uses the accelerator pedal depression magnitude $\theta acc$ and the vehicle speed, the vehicular running performance is satisfactory. Particularly, in the two-shaft type gas turbine engine vehicle, a problem arises in that the acceleration response characteristic is low and causes an acceleration lag which has an adverse affect on the drivability during the transition from a steady state to an acceleration state.

This problem will be further discussed in detail. The output characteristic of the gas turbine engine is illustrated in FIG. 3, wherein the revolution speed N1 of the gas generator GG is a primary factor for determining the engine output. The rotation speed N3 at the engine output shaft obtained through the reduction gear R/G, however, is determined in accordance with selected speed ratio of the automatic power transmission which is associated with the torque converter, and the vehicle speed. The revolution speed N1 of the gas generator GG is determined to establish a balance between an engine output power demanded by the vehicle and the actual engine output, independently of the rotation speed N3 at the output shaft of the engine. Accordingly, when the two-shaft gas turbine engine is used as a prime mover of the automotive vehicle, it is important to obtain satisfactorily high response characteristics of the revolution speed N1 of the gas generator GG, which is a primary factor for determining the engine output, in the acceleration and deceleration states, to thus enhance the vehicular driving performance, since the fluctuation of the output at the automotive engine is substantially large.

Especially, in a conventional vehicle employing a gas turbine engine, and adjusting the driving torque delivery by adjusting the speed ratio through the automatic power transmission, it is general practice to set a target revolution speed N1set of the compressor turbine CT corresponding to the accelerator pedal depression magnitude, and to adjust a fuel flow rate Gf to supply fuel to the engine so that the target revolution speed N1set of the compressor turbine CT is reached. During this process, a lag occurs in the response during an adjustment of the revolution speed N1 of the compressor turbine CT versus the accelerator pedal depression magnitude $\theta acc$. The magnitude of the response lag occurring in a normal gas turbine engine is over 1 sec. at 10000 r.p.m.

Accordingly, during a transition from the steady state to an acceleration state, the acceleration of the vehicle is unacceptably slow, and during a decelerating transition, a sufficient deceleration cannot be obtained quickly enough to satisfy the required deceleration. Such low acceleration and deceleration characteristics will adversely affect the vehicular drivability.

SUMMARY OF THE INVENTION

An object of the present invention is to provide a method and system of controlling a shift of a transmission speed ratio in a gas turbine engine vehicle, by which a vehicular acceleration is significantly enhanced by improving vehicular acceleration and deceleration characteristics affected by a response lag in a variation of a revolution speed N1 of the compressor turbine CT, which occurs in a conventional vehicle employing a two-shaft type gas turbine engine with a transmission speed ratio control of an automatic power transmission A/T.

According to one aspect of the invention, a transmission speed ratio of an automatic power transmission A/T is shifted to a one stage higher speed ratio from the current speed ratio in response to an increasing depression of the accelerator pedal for an initiation of an acceleration transition state operation, to move from a steady state to an acceleration state. As a result, although the rotation speed N3 of the output shaft of the power turbine PT via the reduction gear R/G is reduced, an inertia force generated at the power turbine shaft and the components associated there with serves as an acceleration energy, to thus improve the response characteristics of the vehicle at an initial stage of the acceleration.

Therefore, according to the present invention, an adverse affect on the acceleration and deceleration characteristics of the vehicle by response lag in the compressor turbine CT, which can occur in a vehicle employing the two-shaft gas turbine engine and adjusting power transmission speed ratio by the automatic power transmission as in the prior art, can be successfully prevented, and thus the present invention significantly enhances the vehicular acceleration and deceleration.

BRIEF DESCRIPTION OF THE DRAWINGS

The present invention will be understood more clearly from the description set forth below with the reference to the accompanying drawings, wherein:

FIGS. 6, 6A and 6B are flowcharts showing one embodiment of a transmission shift control for a gas turbine engine vehicle, according to the present invention;

FIGS. 7, 7A and 7B are flowcharts showing another embodiment of a transmission shift control for a gas turbine engine vehicle, according to the present invention;

DESCRIPTION OF THE PREFERRED EMBODIMENTS

Figure 1:
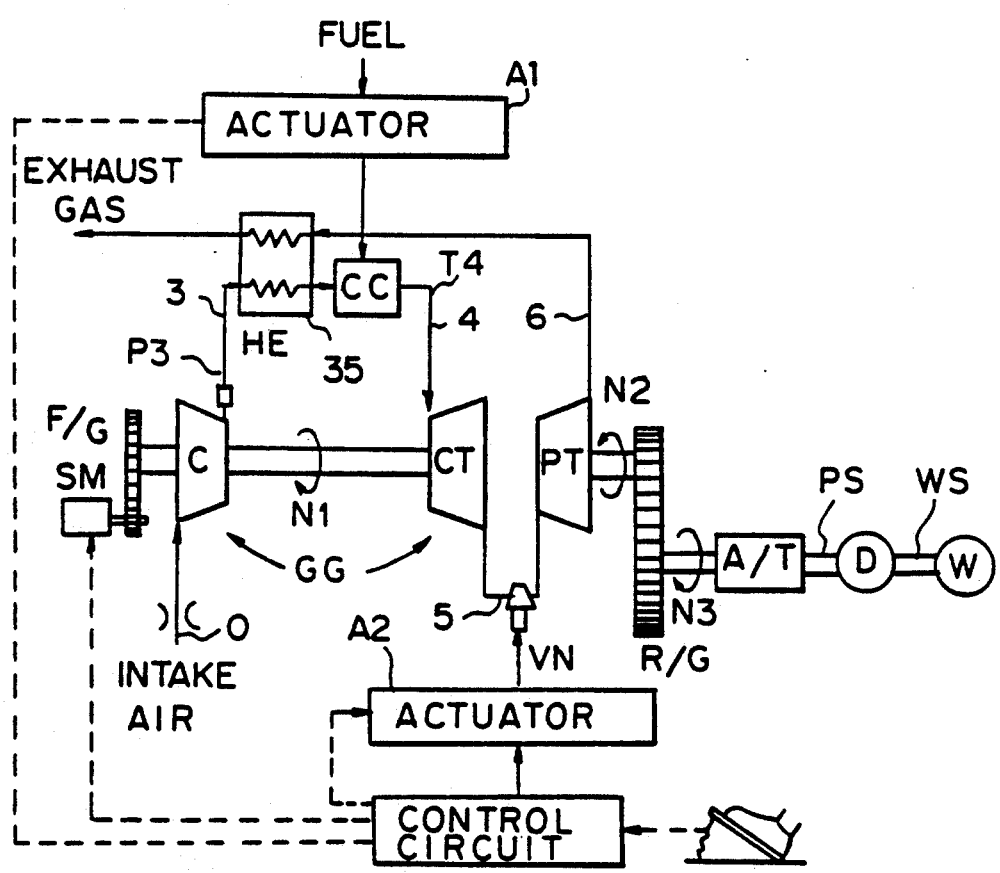
FIG. 1 is a diagram showing the construction of a conventional two-shaft type gas turbine engine.
Figure 2:
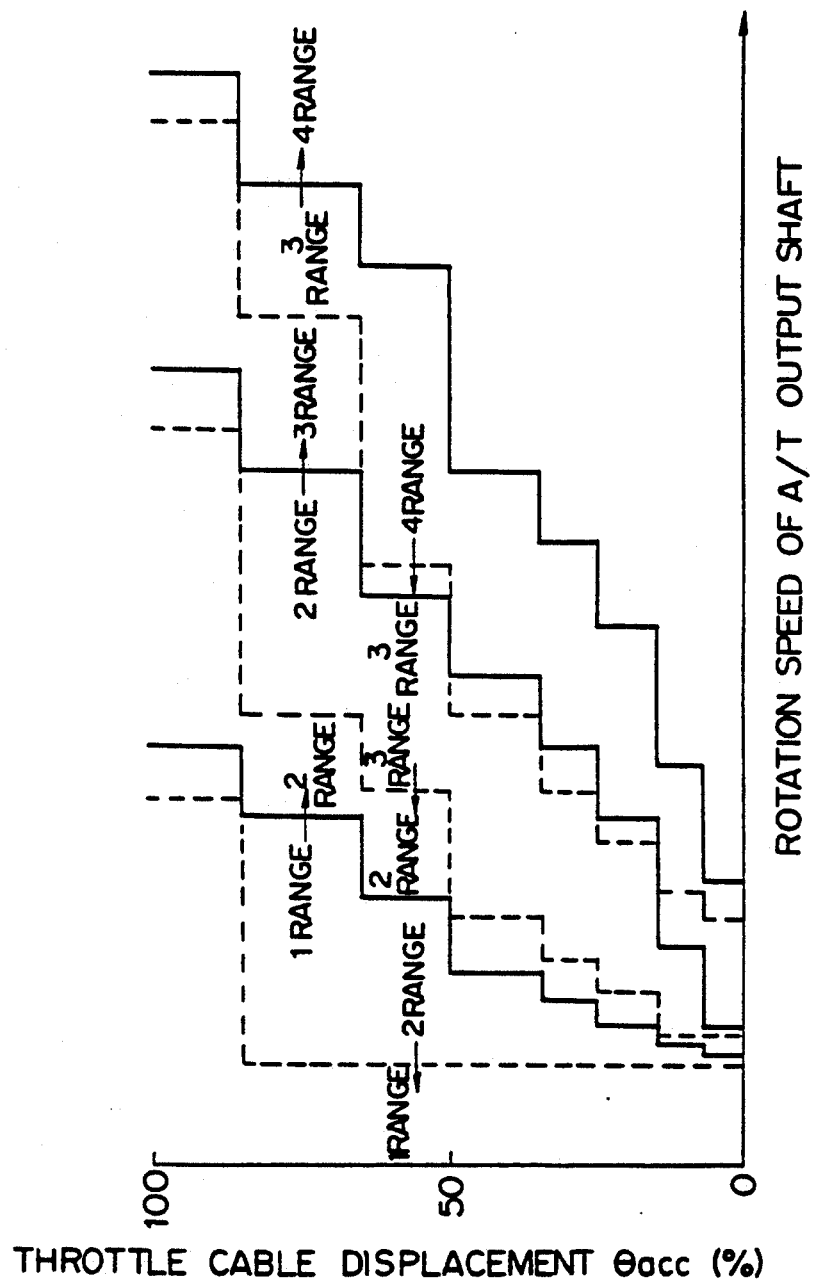
FIG. 2 is a characteristic diagram showing a shift pattern of an automatic power transmission for the conventional gas turbine engine.
Figure 3:
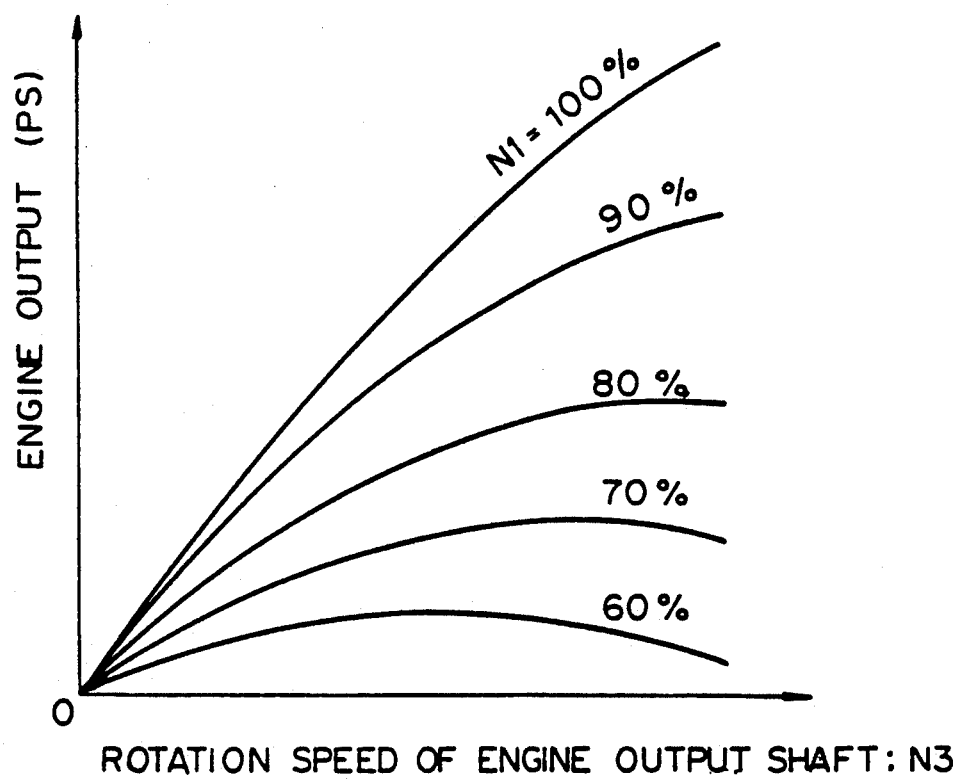
FIG. 3 is a characteristic diagram showing the relationship between a rotation speed at an output shaft of the two-shaft type gas turbine engine and an engine output when a rotation speed of a gas generator is taken as a parameter.
Figure 4:
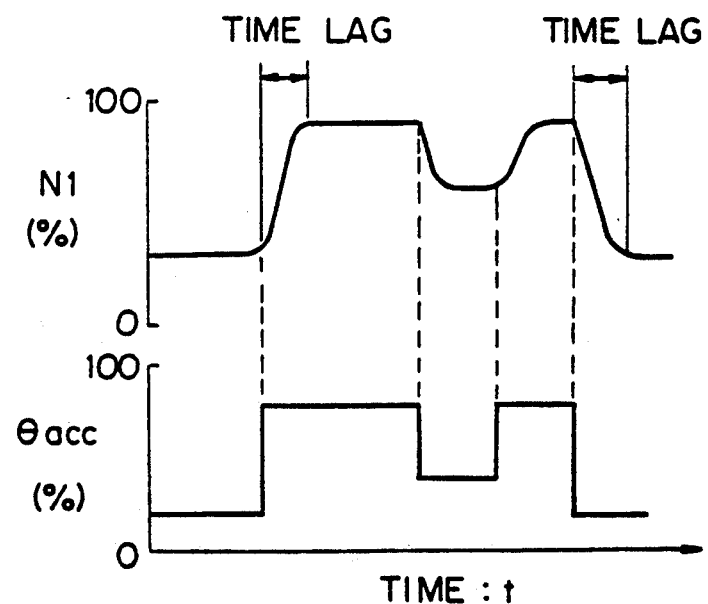
FIG. 4 is a characteristic diagram showing response characteristics of the gas generator when a vehicle is accelerated and decelerated under a conventional transmission shift control method for a gas turbine engine vehicle.
Figure 5:
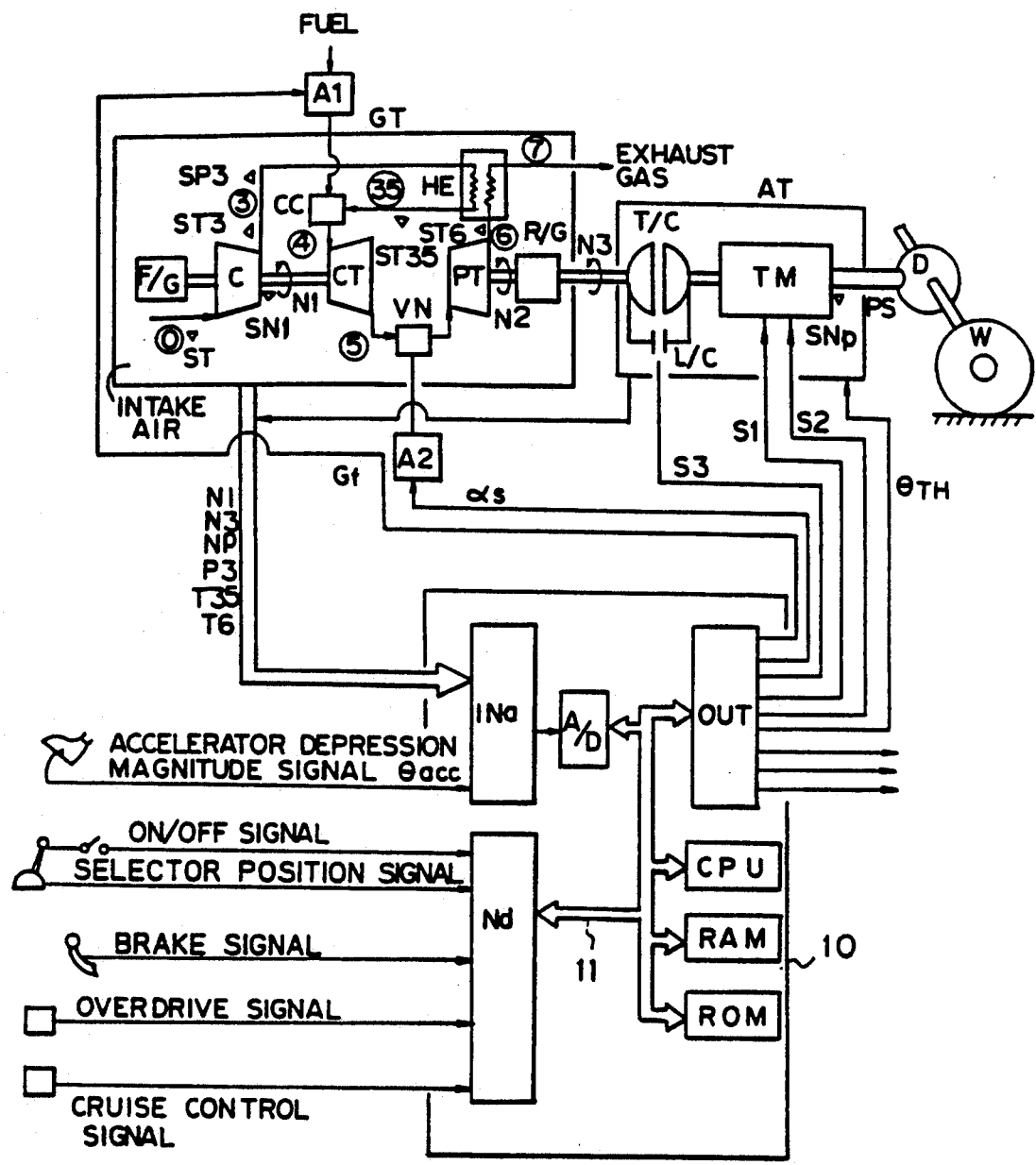
FIG. 5 is diagram showing a construction of a gas turbine engine with an automatic power transmission, to which the present invention is applied.

FIG. 5 illustrates one embodiment of a two-shaft type gas turbine engine according to the present invention. Note, components in FIG. 5 common to those in FIG. 1 are represented by the same reference numerals.

In FIG. 5, GT generally represents a gas turbine engine serving as a prime mover for an automotive vehicle. The gas turbine engine GT comprises a front gear F/G, to which a fuel pump, an oil pump, a starter motor and so forth are connected, a compressor C, a heat exchanger HE, a combustion chamber CC, a compressor turbine CT directly connected to a rotary shaft of the compressor C, a variable nozzle VN, a power turbine PT, and a reduction gear R/G, and so forth. As set forth above, the compressor C and the compressor turbine CT combine to form a gas generator GG.

An intake air is compressed by a compressor C, the compressed air is then heated by the heat exchanger HE, the heated air is mixed with a fuel in the combustion chamber for combustion, to generate a combustion gas, and the combustion gas drives the compressor turbine CT. The combustion gas used for driving the compressor turbine CT is fed to the power turbine PT, via the variable nozzle VN, for driving the latter. Subsequently, the combustion gas is passed through the heat exchanger HE, to heat the compressed intake air, and then exhausted as an exhaust gas to the atmosphere. In FIG. 5, A1 denotes an actuator for supplying fuel to the combustion chamber CC, and A2 denotes an actuator for adjusting an opening degree $\alpha s$ of the variable nozzle.

The revolution speed of the power turbine PT of the gas turbine engine GT is reduced by the reduction gear R/G and transferred to an automatic power transmission A/T. The automatic power transmission A/T employed in the shown embodiment is associated with a torque converter T/C, which includes a lock-up clutch L/C. The automatic power transmission A/T changes the input rotation speed into a rotation speed different from the input speed, at a ratio determined in accordance with the shift position thereof. The output of the automatic power transmission A/T is transferred to a wheel W via a propeller shaft PS and a differential gear unit D, for driving the vehicle.

The operations of the gas turbine engine GT and the automatic power transmission A/T are controlled by a control circuit 10. The control circuit 10 has an analog input interface INa for analog input signals, a digital input interface INd for digital input signals, an analog-to-digital converter (A/D) which performs an analog-to-digital conversion to derive digital signals from the analog signals input through the analog input interface INa, a central processing unit (CPU), a random-access memory (RAM), a read-only memory ROM, and an output circuit OUT, and so forth. The components set forth above are connected to associated components via bus lines 11.

The two-shaft type gas turbine engine GT is provided with a temperature sensor STO for monitoring the atmospheric temperature, a rotation speed sensor SN1 for monitoring a rotation speed of the gas generator GG, a temperature sensor ST3 and a pressure sensor SP3 respectively for monitoring a temperature T3 and a pressure P3 at the outlet of the compressor C, a temperature sensor ST35 for monitoring a temperature T35 at the outlet of the heat exchanger HE, a temperature sensor ST6 for monitoring a temperature T6 at the outlet of the power turbine PT, a rotation speed sensor SN3 for monitoring a rotation speed N3 at the output shaft of the engine, i.e., a rotation speed N3 at the input shaft of the automatic power transmission A/T, a rotation sensor SNp for monitoring rotation speed Np of the propeller shaft, and so forth.

Signals N1, 3, Np, P3, T35 from the foregoing relevant sensors and depression magnitude indicating signal $\theta$acc from the accelerator pedal are input to the analog input interface INa, and an ON/OFF signal from an ignition switch, a shift position signal from a selector lever, a brake signal from a brake, and so forth, are input to the digital input interface INd.

The output circuit OUT outputs a fuel control signal Gf for the actuator A1, to control a fuel flow rate, and a variable nozzle control signal $\alpha$s to control a degree of opening of the variable nozzle VN, a lock-up control signal C3 for commanding an engagement and disengagement of the lock-up clutch L/C of the torque converter T/C, shift control signals S1 and S2 for a power transmission gear assembly TM, and a throttle cable signal $\theta$th, and so forth. The shift control signals S1 and S2 are ON/OFF signals and represent, in combination, operational ranges of the automatic power transmission A/T. For example, where the automatic power transmission A/T has four forward speed ratios, one of the first to fourth speed ranges is identified by a combination of the shift control signals S1 and S2. A selection of the operational range is performed in accordance with the engine operating characteristics. Example of combinations of the shift control signals S1 and S2 and the operational ranges of the automatic power transmission A/T to be identified are shown in the following table:

TABLE

| | Operational Range | | | |
|---|---|---|---|---|
| | 1 | 2 | 3 | 4 |
| S1 | ON | ON | OFF | OFF |
| S2 | OFF | ON | ON | OFF |

As can be appreciated, in the present invention the shift characteristics of the automatic power transmission A/T are controlled by controlling the shift control signals S1 and S2. To assist with an understanding of the process of control to be performed according to the present invention, a control of an automatic power transmission in an automotive vehicle employing a reciprocating internal combustion engine will be briefly discussed.

(1) Control of Automatic Power Transmission A/T during Rapid Acceleration

Since the engine has a relatively small output torque, the transmission shift characteristic is set so that a relatively lower speed range can be utilized to maintain a high engine speed. Therefore, for an acceleration at a high speed range or an acceleration for overtaking, a quick shift down of the transmission speed ratio, i.e., a kick-down, is performed.

(2) Control of Automatic Power Transmission A/T during Moderate Acceleration

To obtain a better fuel consumption, a shift characteristic designating a relatively low engine speed is utilized.

(3) Control of Automatic Power Transmission A/T during Deceleration

To obtain a better fuel consumption, a higher speed ratio is selected, to maintain the engine speed at as low a value as possible.

In an automotive vehicle employing a two-shaft type gas turbine engine, a control of the automatic power transmission A/T in the prior art, is performed by utilizing the same shift characteristics as used for the automatic power transmission A/T, when the vehicle has a reciprocating engine.

In the present invention, it is noted that the rotary shaft of the gas generator GG and the turbine shaft of the power turbine PT can be driven independently, and to utilize this feature, the present invention performs shift control in accordance with the following characteristics.

(1) Control of Automatic Power Transmission A/T during Acceleration

For a vehicular acceleration, such as an acceleration from a standstill, the shift characteristics of the automatic power transmission A/T, in which a substantially high speed rotation is used for the turbine shaft of the power turbine PT, is selected.

(2) Control for Automatic Power Transmission A/T during Acceleration for Overtaking In the normal reciprocating engine, the transmission speed ratio is maintained at the current speed ratio, or shifted down to obtain a higher engine speed for a greater engine output torque, e.g., shifted down from third speed to second speed. In contrast, according to the present invention, a shift up of the speed ratio, e.g., a shift from first speed to second speed, is made for obtaining an acceleration when overtaking.

(3) Control for Automatic Power Transmission A/T during Deceleration

Shift characteristics are utilized by which, as long as the rotation speed of the turbine shaft of the power turbine PT does not exceed an acceptable maximum rotation speed (revolution limit), a rapid shift down is made, to thus maintain the engine revolution speed at as high a value as possible.

One example of control process performed by the control circuit of FIG. 5, will be discussed herebelow with reference to the flowcharts of FIGS. 6A and 6B.

When the key is switched or ignition switch is turned ON, initial values for controlling the fuel flow rate Gf and degree of opening $\alpha$s of the variable nozzle VN are set at step 601, and at step 602, input signals, such as N1, N3, Np, $\theta$acc, P3, and so forth are read out. At step 603, an arithmetic operation is carried out to derive a fuel flow rate Gf and an degree of opening αs of the variable nozzle VN, and the control proceeds to step 604.

At step 604, it is determined whether or not the gas turbine engine GT is driven in a steady state, and when the driving condition at step 604 is a steady state, the control proceeds to step 605; otherwise the control proceeds to step 609. When the gas turbine engine GT is in the steady state, a steady state control is performed for controlling a transmission speed ratio of the automatic power transmission A/T, in which the transmission speed ratio is determined based on the engine driving condition, at step 605. Note, any known process applicable to the performing of a shift control for the automatic power transmission associated with the gas turbine engine may be used as the process at step 605. Once the transmission speed ratio is derived through the process at step 605, shift control signals S1 and S2 for the power transmission gear assembly TM of the automatic power transmission, which correspond to the derived transmission speed ratio obtained at step 605, and a lock-up control signal S3 for controlling an engaging and disengaging of the lock-up clutch L/C in the torque converter T/C coupled with the automatic power transmission A/T, are generated at step 606. The shift control signals S1 and S2 and the lock-up control signal S3 are output together with the signals commanding the degree of opening αs and the fuel flow rate Gf, at step 607, an adjustment of the control cycle time is performed at step 608, and subsequently, the process returns to step 602.

On the other hand, when it is determined that the gas turbine engine GT is not in a steady state, at step 604, the process goes to the step 609 and it is determined whether or not the gas turbine engine GT was in the steady state in the cycle immediately preceding step 609. When it is determined that the gas turbine engine GT was in the steady state the control proceeds to step 610. At step 610, it is determined whether or not the gas turbine engine GT is in an accelerating state. When the result at step 610 is YES, since the driving condition of the gas turbine engine GT has moved from the steady state to the accelerating state, for a transition to a start of the acceleration, the control proceeds to step 619, in which it is determined whether or not the rotation speed N3 at the engine output shaft is higher than or equal to a rotation speed criterion N3e, at which a shift up of transmission speed ratio is effective. If N3≧N3e, the control proceeds to step 620, and at step 620, the transmission speed ratio is shifted up from the current speed ratio to a one stage higher speed ratio. On the other hand, when the result at step 610 is NO, since the driving condition of the gas turbine engine GT has moved from the steady state to the deceleration state, the control proceeds to step 615, and at the step 615, a down-shift to a one stage lower speed ratio than the current speed ratio is made. After completing the process at either step 615 or step 619, the routine returns to step 602.

On the other hand, when it is determined at step 609 that the gas turbine engine GT was not in a steady state in the immediately preceding cycle, and the driving condition of the gas turbine engine GT is in an acceleration or deceleration state, then the control proceeds to step 611 and it is determined whether or not the gas turbine engine GT is in an acceleration state.

When the result at step 611 is NO, the gas turbine engine GT is in a deceleration state, and the control proceeds to step 612. At step 612, it is determined whether or not the gas turbine engine GT was in an acceleration state at the immediately preceding cycle. At this step, therefore, it is determined whether the gas turbine is in an deceleration state or is in a transition from an acceleration state to a deceleration state. When the result at step 612 is NO, the gas turbine engine GT is in a deceleration state, and the control proceeds to step 613 in which a deceleration automatic power transmission A/T at the current speed ratio, is performed.

Figure 9:
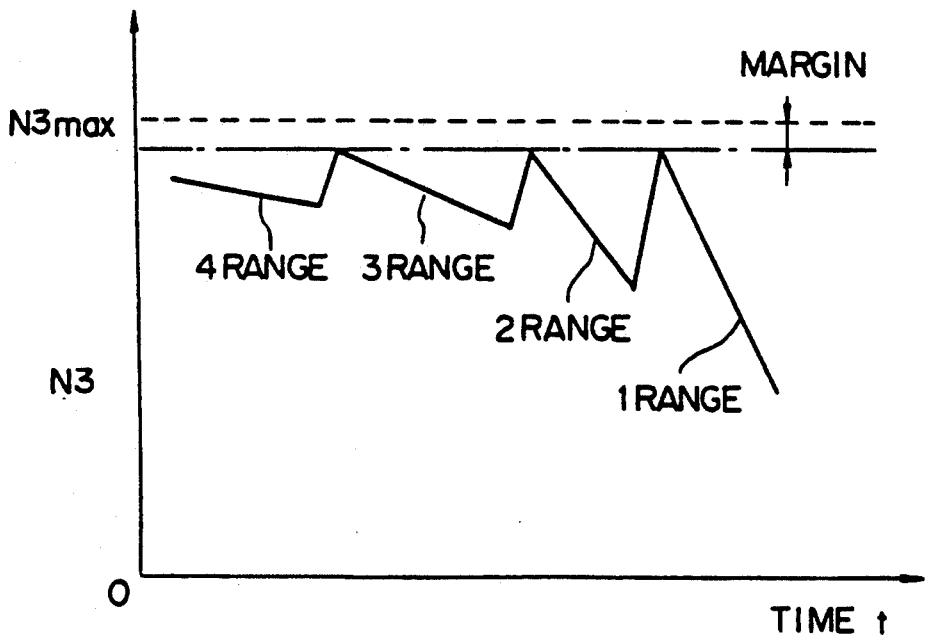
FIG. 9 is a chart showing relationship between a shift condition of the automatic power transmission and a rotation speed of an output shaft during a deceleration; and, FIG. 10 is a chart showing waveforms at various points in a transmission speed ratio control for a gas turbine engine vehicle, according to the present invention.

The deceleration control is performed according to the deceleration control process for a normal two-shaft gas turbine engine GT as shown in FIG. 9. In this deceleration control, it is determined whether or not the driving condition of the automatic power transmission A/T has a timing appropriate to a shift down operation, at step 614. When the driving condition of the automatic power transmission A/T is not at a timing appropriate for a shift down, and thus the result at step 614 is NO, the process goes to the step 606. On the other hand, when the driving condition is at a timing appropriate for a shift down, and thus the result at step 612 is YES, the process goes to the step 615 to perform a down-shift from the current speed ratio to a one stage lower speed ratio, and subsequently, the process goes to step 606. The process following step 606 is as described above.

Next, the process when the result at step 611 is YES will be discussed. In this case, the gas turbine engine GT is in an acceleration state, and thus the control proceeds to step 616, where it is determined whether or not the driving condition of the gas turbine engine GT in the immediately preceding cycle was a deceleration state. At this step, it is determined whether the gas turbine engine GT is in an acceleration state or in a transition from a deceleration state to an acceleration state. When the result at step 616 is NO, it is determined that the gas turbine engine GT is in an acceleration state, and thus at step 617, an acceleration control is carried out while maintaining the current speed ratio of the automatic power transmission A/T.

Figure 8:
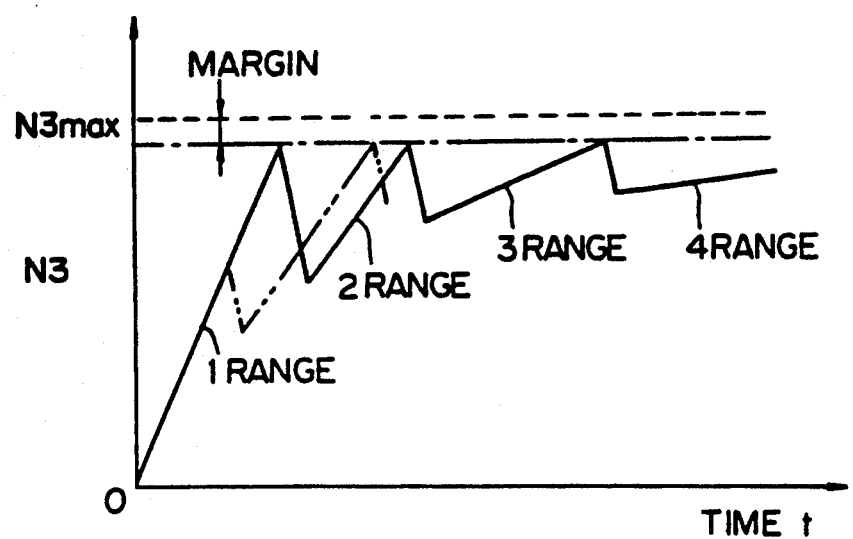
FIG. 8 is a chart showing a relationship between a shift condition of the automatic power transmission and a rotation speed of an output shaft during an acceleration.

The acceleration control is performed according to the process of an acceleration control for the normal two-shaft type gas turbine engine, as shown in FIG. 8. In the process of the acceleration control, the rotation speed N3 of the output shaft of the engine is checked to determine whether it has reached a predetermined acceptable maximum rotation speed N3max (practically a rotation speed set with a given margin for an actual acceptable maximum rotation speed N3max). When N3<N3max (NO), the process goes to the step 606. On the other hand, when N3>N3max, the control proceeds to step 619, and it is determined whether the instant rotation speed N3 of the output shaft of the engine is higher than the rotation speed criterion N3e at which a shift up of the transmission speed ratio is effective.

When N3≧N3e, the transmission speed ratio is shifted up by one stage higher than the current speed ratio at step 618, and subsequently, the process goes to the step 606. On the other hand, when N3<N3e, the control proceeds to step 621 and the current speed ratio is maintained.

Figure 10:
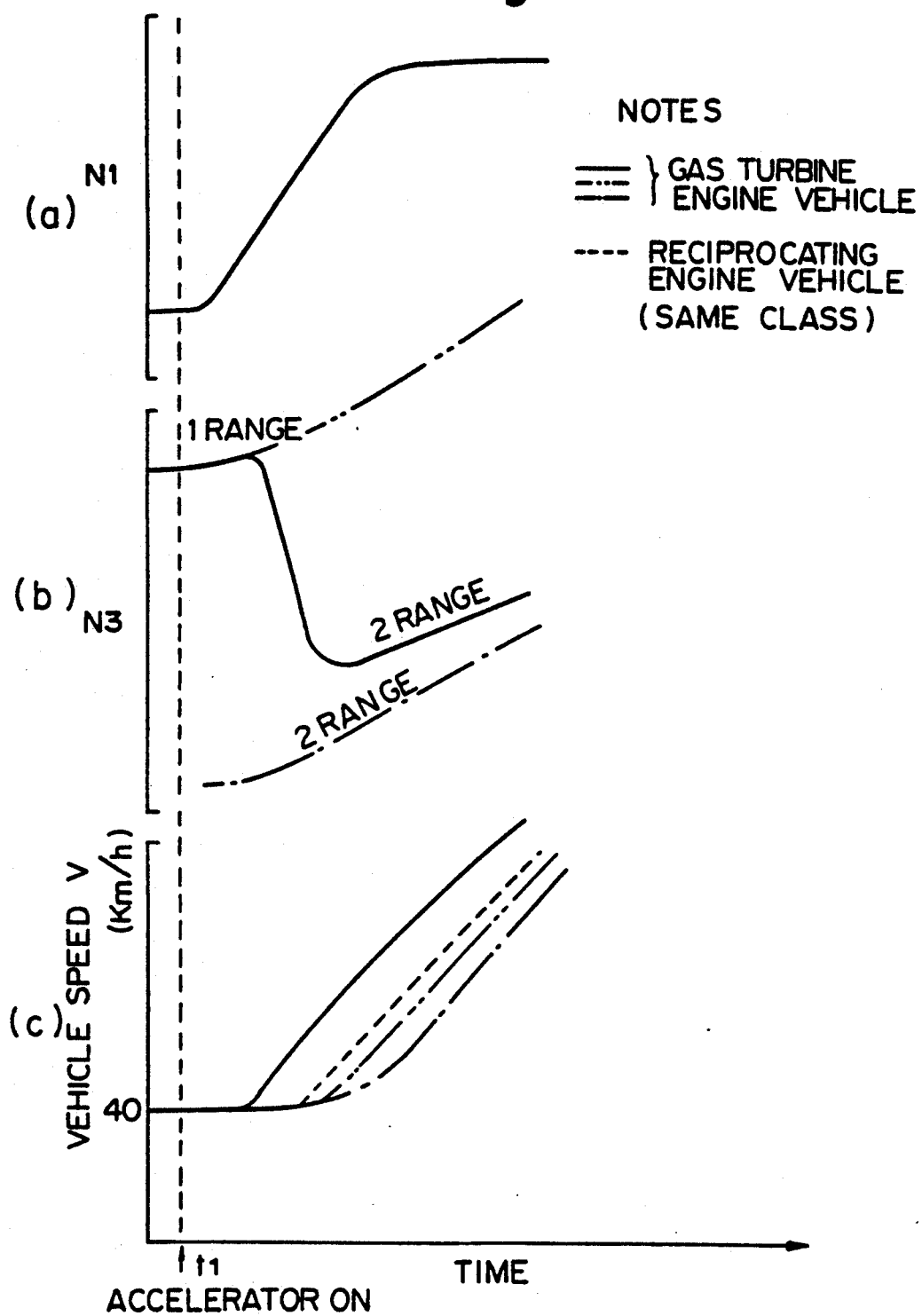

FIGS. 10A to 10C respectively show variations of the revolution speed N1 of the gas generator GG, variations of the rotation speed N3 of the output shaft of the engine (rotation speed of the input shaft of the automatic power transmission A/T), and variations of vehicle speed according to an elapse of time. In FIGS. 10A to 10C, a timing t=t1 represents the timing at which the accelerator pedal is depressed for an acceleration. In the example of FIGS. 10A to 10C, the gas turbine engine GT is maintained in a steady state before the timing t=t1. In the shown example, before the timing t=t1, the vehicle is driven at 40 km/h in a steady state.

According to the present invention, in response to a depression of the accelerator pedal at the timing t1, the automatic power transmission A/T operated at a first speed is shifted up to a second speed, as shown in FIG. 10B, and as a result, the rotation speed N3 at the input shaft of the automatic power transmission A/T is lowered, and thus the rotation speed of the power turbine PT is accordingly lowered. At this time, an inertia force is generated in the power turbine shaft and components associated therewith for co-rotation, to cause an acceleration of the vehicle as illustrated by the solid line in FIG. 10C. As can be seen from FIG. 10C, the vehicular acceleration characteristic illustrated by the solid line C exhibits a higher acceleration response than that of the reciprocating engine as illustrated by a broken line in FIG. 10C.

In FIG. 10B, the characteristic illustrated by a two-dot line are an acceleration characteristic obtained when the speed ratio of the automatic power transmission A/T is not shifted up in the conventional control process. In such a case, as also illustrated by a two-dot line in FIG. 10C, the vehicular acceleration characteristic showing an acceleration of the vehicle speed V is worse than the acceleration characteristic of the vehicle speed V in the reciprocation type engine. In addition, the characteristics illustrated by one-dot lines in FIGS. 10B and 10C are acceleration characteristics of the vehicular speed V during an acceleration from the steady state at a vehicle speed of 40 km/h and in a second speed range. As can be appreciated, in this case, the vehicular acceleration characteristics are much worse than those of the reciprocation type engine.

As set forth above, a control of the transmission gear assembly TM of the automatic power transmission A/T is made possible by appropriately selecting a combination of the shift control signals S1 and S2. On the other hand, as shown in FIG. 5, since the depression magnitude $\theta$acc is taken as one of the control parameters, it is possible to detect the degree of acceleration required. For example, the degree of acceleration required may be detected through a differentiated value of the depression magnitude $\theta$acc of the accelerator pedal. Therefore, an optimal automatic power transmission control can be obtained in line with the degree of acceleration required. Namely, when the degree of acceleration required is high, a shift up of the transmission speed ratio is performed during the control of the automatic power transmission A/T, to improve the acceleration. On the other hand, when the degree of acceleration required is low, a conventional acceleration is made to provide a moderate acceleration of the vehicle. An example of the control process made in line with the degree of acceleration required is illustrated in FIGS. 7(A) and 7(B) as a sequence flowchart.

Figure 6B:
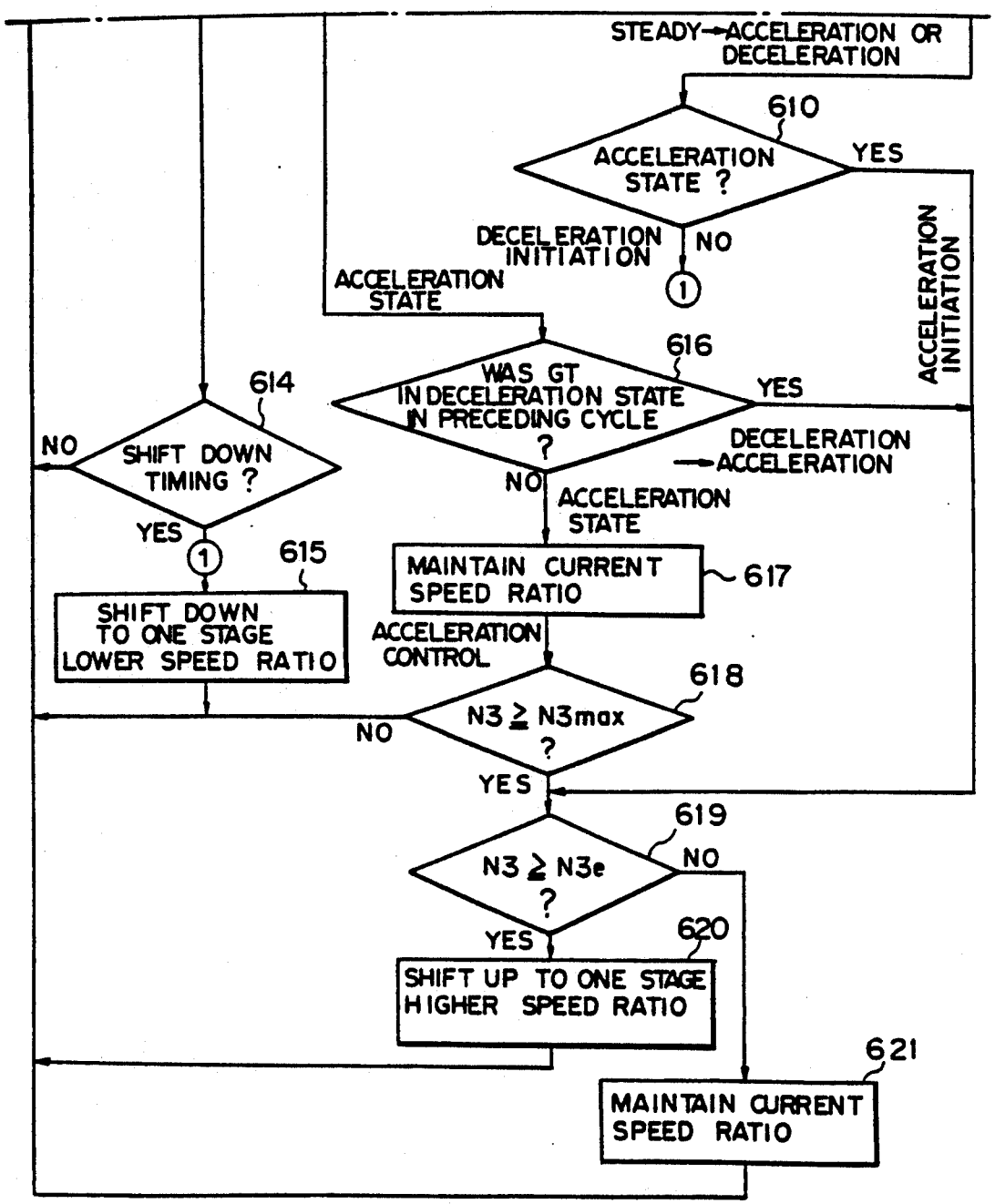
Figure 7B:
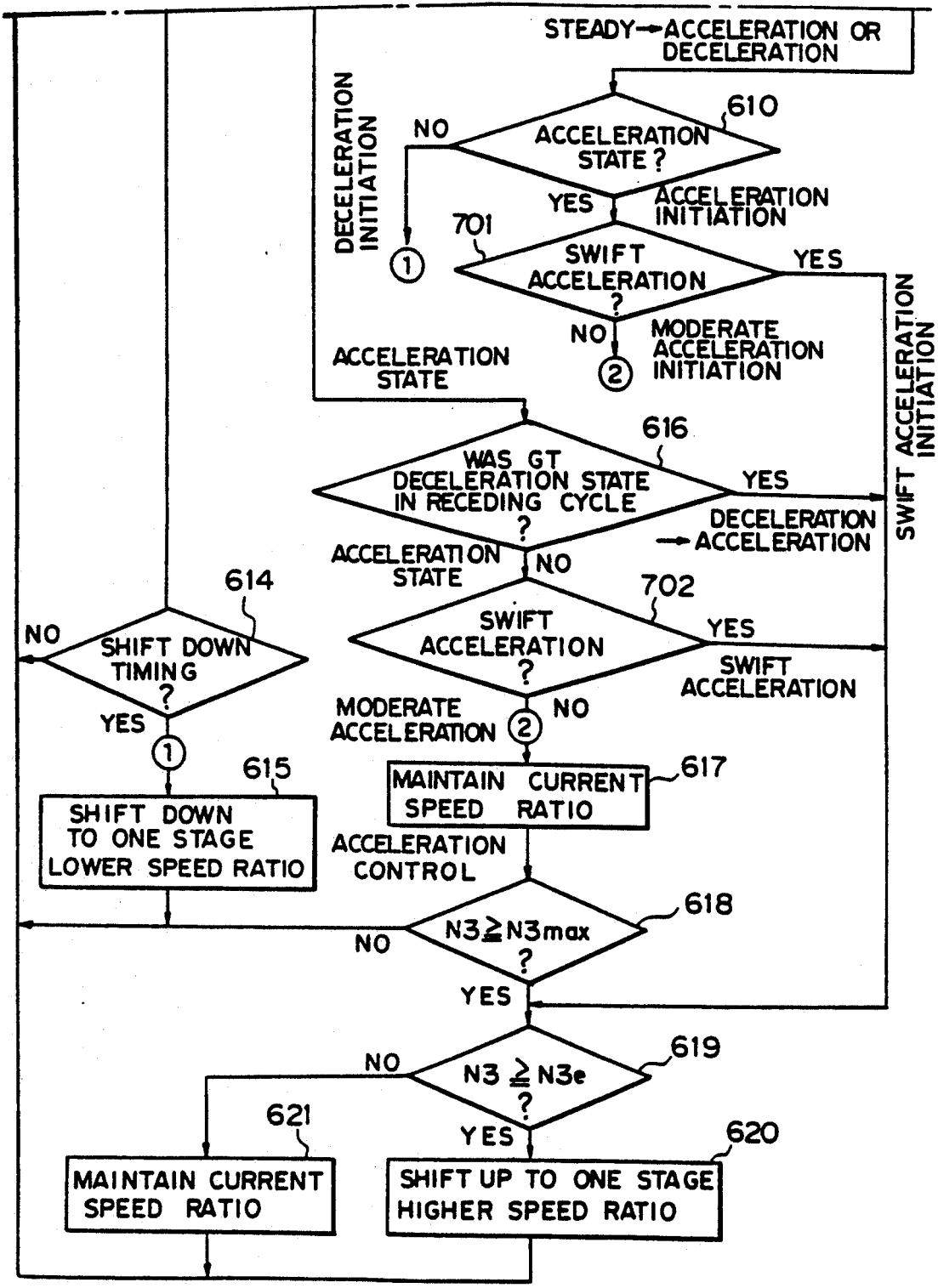

Note, the process illustrated in FIGS. 7A and 7B contains major steps identical to those in FIGS. 6A and 6B set forth above, and therefore, steps identical to or substantially the same as those of the process in FIGS. 6A and 6B will be represented by the same step number, and thus a detailed discussion thereof will not be made. Namely, the following discussion made with reference to FIGS. 7A and 7B will be concentrated on processes different from those of FIGS. 6A and 6B. As can be seen from the flowcharts of FIGS. 7A and 7B, the processes different from those of FIGS. 6A and 6B are those performed at step 701 and executed after the process at step 610, and at step 702 following step 616. Namely, the process in FIG. 7B introduces a feature of a discrimination of whether a rapid acceleration or moderate acceleration is required following a determination that the engine is starting an acceleration or is in an acceleration state.

The step 701 is executed when it is determined that the engine is in an acceleration state at step 610. When it is determined that a rapid acceleration is required at step 701, the process goes to the step 619 for a shift up of the transmission speed ratio to one stage higher than the current speed ratio. On the other hand, when it is determined that a rapid acceleration is not required, the process goes to the step 617 and the current transmission speed ratio is maintained.

Similarly, the process at the step 702 is executed when it is determined that the engine is in an acceleration state. At step 702, it is determined whether a rapid acceleration or a moderate acceleration is required. When a rapid acceleration is required, process goes to the step 618 and the process at the step 619 and subsequent steps is carried out. In this process, it is determined whether or not the instant rotation speed N3 of the output shaft of the engine is higher than or equal to the rotation speed criterion N3e, at which a shift up the transmission speed ratio is effective for obtaining a rapid acceleration. According to the result of this determination, the current transmission speed ratio is maintained or the transmission speed ratio is shifted up to one stage higher than the current speed ratio. On the other hand, when the result at step 702 shows that a moderate acceleration is required, the process goes to the step 617 and the current transmission speed ratio is maintained.

As set forth above, according to the present invention, the transmission speed ratio of the automatic power transmission A/T is shifted up upon acceleration so that the inertia force of the power turbine shaft and associated components can be used as an energy for accelerating the vehicle. As a result, a shift shock is avoided and a significantly enhanced vehicular acceleration is obtained. Further, by maintaining the rotation speed of the power turbine at a high speed during a deceleration, an enhanced engine braking performance can be obtained. Furthermore, by maintaining the shaft and associated components of the power turbine PT at a high rotation speed, an effect of an energy accumulation, such as that obtained by a flywheel, can be obtained during deceleration. Therefore, the inertia force on the shaft of the power turbine PT can be used for a subsequent acceleration. As a result, if an acceleration is required immediately after a deceleration, a substantially enhanced acceleration can be obtained. Thus, as can be appreciated, the present invention can significantly improve the performance of a gas turbine engine vehicle.

I claim:

1. A method for controlling a shift of a transmission speed ratio in an automatic power transmission employed in a gas turbine engine vehicle having a two-shaft type gas turbine engine including a gas generator constituted by a compressor and a compressor turbine arranged coaxially with said compressor, a combustion chamber, a variable nozzle, and a power turbine rotatable about a turbine shaft independently of a shaft of said compressor and said compressor turbine, wherein the method comprises the steps of:
- detecting a steady state of said engine;
- detecting an acceleration of the engine;
- determining whether an engine accelerating condition satisfies a predetermined condition, wherein said predetermined condition is a requirement for a degree of acceleration from the steady state at more than a predetermined value;
- shifting a transmission speed ratio to a stage higher than a current transmission speed ratio when an acceleration condition satisfying said predetermined condition is detected; and
- selecting shift characteristics of said automatic power transmission so that as high a rotational range of said power turbine as possible is used when the requirement for a degree of acceleration from the steady state is less than said predetermined value.

2. A method as set forth in claim 1, which further comprises a step of selecting shift characteristics of said automatic power transmission for performing a shift down operation to maintain the engine speed at as high a speed as possible within a range in which the rotation speed of said power turbine is maintained at a speed lower than or equal to an acceptable maximum rotation speed, when the engine is decelerated.

3. A system of controlling a shift of a transmission speed ratio in an automatic power transmission employed in a gas turbine engine vehicle having a two-shaft type gas turbine engine including a gas generator constituted by a compressor and a compressor turbine arranged coaxially with said compressor, a combustion chamber, a variable nozzle, and a power turbine rotatable about a turbine shaft independently of a shaft of said compressor and said compressor turbine, wherein the system comprises:
- means for detecting a steady state of said engine, said means for detecting a steady state being coupled to said engine;
- means for directly detecting an acceleration of the engine, said means for detecting an acceleration being coupled to said engine;
- means for determining whether the engine accelerating condition satisfies a predetermined condition, said means for determining being coupled to said means for detecting an acceleration, wherein said predetermined condition is a requirement for a degree of acceleration from the steady state at more than a predetermined value;
- means for shifting up the transmission when a condition of said engine changes from a decelerating condition, said decelerating condition including a steady state, to an accelerating condition, said means for shifting up being coupled to said transmission; and
- means for selecting shift characteristics of said automatic power transmission so that as high a rotational range of said power turbine as possible is used when the requirement for a degree of acceleration from the steady state is less than a predetermined value; and
- means for shifting a transmission speed ratio to a stage higher than a current transmission speed ratio when an engine accelerating condition satisfying said predetermined condition is detected, said means for shifting a transmission speed ratio being coupled to said transmission.

4. A system of controlling a shift of a transmission speed ratio in an automatic power transmission employed in a gas turbine engine vehicle having a two-shaft type gas turbine engine including a gas generator constituted by a compressor and a compressor turbine arranged coaxially with said compressor, a combustion chamber, a variable nozzle, and aa power turbine rotatable about a turbine shaft independently of a shaft of said compressor and said compressor turbine, wherein the system comprises:
- means for detecting a steady state of said engine, said means for detecting a steady state being coupled to said engine;
- means for directly detecting an acceleration of the engine, said means for detecting an acceleration being coupled to said engine;
- means for determining whether the engine accelerating condition satisfies a predetermined condition, said means for determining being coupled to said means for detecting an acceleration, wherein said predetermined condition is a requirement for a degree of acceleration from the steady state at more than a predetermined value;
- means for shifting up the transmission when a condition of said engine changes from a decelerating condition, said decelerating condition including a steady state, to an accelerating condition, said means for shifting up being coupled to said transmission;
- means for selecting shift characteristics of said automatic power transmission for performing a shift down operation to maintain the engine speed at as high a speed as possible within a range in which the rotation speed of said power turbine is maintained at a speed lower than or equal to an acceptable maximum rotation speed, when the engine is decelerated, said means for selecting shift characteristics being coupled to said automatic power transmission;
- means for shifting a transmission speed ratio to a stage higher than a current transmission speed ratio when an engine accelerating condition satisfying said predetermined condition is detected, said means for shifting a transmission speed ratio being coupled to said transmission.

5. A system of controlling a shift of a transmission speed ratio in an automatic power transmission employed in a gas turbine engine vehicle having a two-shaft type gas turbine engine including a gas generator constituted by a compressor and a compressor turbine arranged coaxially with said compressor, a combustion chamber, a variable nozzle, and aa power turbine rotatable about a turbine shaft independently of a shaft of said compressor and said compressor turbine, wherein the system comprises:
- means for detecting a steady state of said engine, said means for detecting a steady state being coupled to said engine;
- means for directly detecting an acceleration of the engine, said means for detecting an acceleration being coupled to said engine;
- means for determining whether the engine accelerating condition satisfies a predetermined condition, said means for determining being coupled to said means for detecting an acceleration, wherein said predetermined condition is a requirement for a degree of acceleration from the steady state at more than a predetermined value;

means for shifting up the transmission when a condition of said engine changes from a decelerating condition, said decelerating conditions including a steady state, to an accelerating condition, said means for shifting up being coupled to said transmission; and means for shifting a transmission speed ratio to a stage higher than a current transmission speed ratio when an engine accelerating condition satisfying said predetermined condition is detected, said means for shifting a transmission speed ratio being coupled to said transmission;

means for selecting shift characteristics of said automatic power transmission by which as high a rotational range of said power turbine as possible is used when the requirement for a degree of acceleration from the steady state is less than a predetermined value;

means for selecting shift characteristics of said automatic power transmission for performing a shift down operation to maintain the engine speed at as high a speed of said power turbine is maintained at a speed lower than or equal to an acceptable maximum rotation speed, when the engine acceleration is negative.

* * * * *

UNITED STATES PATENT AND TRADEMARK OFFICE
CERTIFICATE OF CORRECTION

PATENT NO. : 5,233,888
DATED : August 10, 1993
INVENTOR(S) : Daiki FUKUDA It is certified that error appears in the above-identified patent and that said Letters Patent is hereby corrected as shown below:

ABSTRACT, line 11, delete "a" before "vehicular", change "characteristics" to --characteristic--, and change "a" at the end of the line to --the--.

Column 2, line 29, change "affect" to --effect--.

Column 3, line 31, change "there with" to --therewith--.

Column 3, line 37, change "affect" to --effect--.

Column 7, line 1, change "an" to --a--.

Column 8, line 4, change "an" to --a--.

Column 8, line 8, between "deceleration" and "automatic" insert --control, which maintains the speed ratio of the--.

Column 8, line 50, change "7" to --2--.

Column 10, line 24, change "618" to --619--.

Column 10, line 28, between "up" and "the" insert --of--.

Column 11, line 27, change "of controlling" to --for controlling--.

UNITED STATES PATENT AND TRADEMARK OFFICE
CERTIFICATE OF CORRECTION

PATENT NO. : 5,233,888
DATED : August 10, 1993
INVENTOR(S) : Daiki FUKUDA It is certified that error appears in the above-identified patent and that said Letters Patent is hereby corrected as shown below:

Column 12, line 1, change "of controlling" to --for controlling--.

Column 12, line 7, change "aa" to --a--.

Column 12, line 46, change "of controlling" to --for controlling--.

Column 12, line 52, change "aa" to --a--.

Column 13, line 3, change "conditions" to --condition--.

Column 14, line 6, after "value;" insert --and--.

Column 14, line 10, between "a" and "speed" insert --speed as possible within a range in which the rotation--.

Signed and Sealed this

Third Day of May, 1994

BRUCE LEHMAN

*Attest:*

*Attesting Officer*     *Commissioner of Patents and Trademarks*